United States Patent
Andersson et al.

(10) Patent No.: US 9,714,705 B2
(45) Date of Patent: Jul. 25, 2017

(54) CONTROL METHOD FOR A POWERTRAIN FOR A VEHICLE AND CORRESPONDINGLY CONTROLLED POWERTRAIN

(71) Applicant: VOLVO TRUCK CORPORATION, Göteborg (SE)

(72) Inventors: Henrik Andersson, Göteborg (SE); Anders Eriksson, Torslanda (SE)

(73) Assignee: Volvo Truck Corporation, Göteborg (SE)

( * ) Notice: Subject to any disclaimer, the term of this patent is extended or adjusted under 35 U.S.C. 154(b) by 25 days.

(21) Appl. No.: 14/778,762

(22) PCT Filed: Mar. 27, 2013

(86) PCT No.: PCT/EP2013/000931
§ 371 (c)(1),
(2) Date: Sep. 21, 2015

(87) PCT Pub. No.: WO2014/154228
PCT Pub. Date: Oct. 2, 2014

(65) Prior Publication Data
US 2016/0047467 A1    Feb. 18, 2016

(51) Int. Cl.
| | | |
|---|---|---|
| *F16H 61/16* | (2006.01) | |
| *F16H 61/12* | (2010.01) | |
| *F16H 61/02* | (2006.01) | |
| *F16H 59/78* | (2006.01) | |
| *F16H 59/66* | (2006.01) | |
| *F16H 59/36* | (2006.01) | |
| *F16H 59/14* | (2006.01) | |
| *B60W 30/188* | (2012.01) | |
| *B60W 30/184* | (2012.01) | |
| *F16H 59/74* | (2006.01) | |

(52) U.S. Cl.
CPC ......... *F16H 61/16* (2013.01); *B60W 30/1843* (2013.01); *B60W 30/1846* (2013.01); *B60W 30/1882* (2013.01); *B60W 30/1884* (2013.01); *F16H 59/14* (2013.01); *F16H 59/36* (2013.01); *F16H 59/66* (2013.01); *F16H 59/78* (2013.01); *F16H 61/0213* (2013.01); *F16H 61/12* (2013.01); *B60W 2510/0638* (2013.01); *B60W 2550/143* (2013.01); *B60W 2710/1005* (2013.01); *B60W 2710/1022* (2013.01); *F16H 2059/147* (2013.01); *F16H 2059/366* (2013.01); *F16H 2059/666* (2013.01); *F16H 2059/743* (2013.01); *F16H 2061/022* (2013.01); *F16H 2061/0216* (2013.01); *F16H 2061/124* (2013.01); *F16H 2061/161* (2013.01)

(58) Field of Classification Search
None
See application file for complete search history.

(56) References Cited

U.S. PATENT DOCUMENTS

| 5,343,780 A | 9/1994 | McDaniel et al. |
|---|---|---|
| 5,738,606 A | 4/1998 | Bellinger |
| 6,067,489 A | 5/2000 | Letang et al. |
| 2003/0119629 A1 | 6/2003 | Kuhstrebe |
| 2006/0236799 A1 | 10/2006 | Hedman |
| 2006/0276951 A1 | 12/2006 | Berglund et al. |
| 2009/0069154 A1 | 3/2009 | Wegeng et al. |
| 2010/0332093 A1 | 12/2010 | Ishikawa et al. |
| 2011/0166754 A1 | 7/2011 | Kolk et al. |

FOREIGN PATENT DOCUMENTS

| CN | 1184740 A | 6/1998 |
|---|---|---|
| CN | 1732346 A | 2/2006 |
| CN | 1829622 A | 9/2006 |
| CN | 1910389 A | 2/2007 |
| CN | 101387338 A | 3/2009 |
| CN | 101675276 A | 3/2010 |
| DE | 33 34 722 A1 | 4/1985 |
| EP | 0 120 189 A2 | 10/1984 |
| EP | 1 256 476 A2 | 11/2002 |
| EP | 1 321 329 A2 | 6/2003 |
| JP | S59183154 | 10/1984 |
| JP | 2006226178 | 8/2006 |
| WO | 2011076226 A1 | 6/2011 |

OTHER PUBLICATIONS

International Search Report (Jan. 7, 2014) for corresponding Internationl App. PCT/EP2013/000931.
International Preliminary Report on Patentability (Apr. 1, 2015) for corresponding Internationl App. PCT/EP2013/000931.
Chinese Official Action (Nov. 30, 2016) for corresponding Chinese App. 201380073903.6.
Japanese Official Action (Mar. 3, 2017) for corresponding Japanese App. 2016-504496.

Primary Examiner — Colby M Hansen
(74) Attorney, Agent, or Firm — WRB-IP LLP

(57) ABSTRACT

A control method is provided for a powertrain in a vehicle, the powertrain including an engine mechanically connected to a gearbox and an Electronic Control Unit (ECU), wherein the method includes allowing an extraordinary gear shift in spite of a first torque comparison indicating an expected engine output torque demand above a first general limit for allowed output torque associated with the extraordinary gear shift provided that: a second torque comparison indicates that the expected engine output torque demand after the extraordinary gear shift is within the limits of a second temporarily increased allowed engine output torque limit; and an extraordinary gear shift criteria is fulfilled indicating a gear shift is allowed the criteria being dependent on at least one parameter chosen among estimated fuel efficiency, engine efficiency, expected future torque demand, time of running the engine above the general engine torque limit and engine temperature.

10 Claims, No Drawings

CONTROL METHOD FOR A POWERTRAIN FOR A VEHICLE AND CORRESPONDINGLY CONTROLLED POWERTRAIN

BACKGROUND AND SUMMARY

The present invention relates to a method for a drive train in a vehicle. The method is particularly directed to the feature of reducing or avoiding excessive engine speed by allowing gear shifts where it should otherwise not be possible.

In vehicles with automatic or semi-automatic transmissions are gear shifts made automatically or semi automatically according to preprogrammed shift strategies or driver initiated shift commands or settings. The shift control strategies may be designed for specific purposes, e.g. to reduce fuel consumption, reduce emissions, provide reliable traction on slippery ground, hill climbing/descending etc. Whatever strategy you choose there are always a number of physical or set limits to take into account as well as predefined restrictions when setting the gear shift strategy or algorithm. In many cases there is a need to find control algorithms which are compromises between different desired features. As an example, it is in general desired to avoid or reduce gear shifts while gear shifts on the other hand are necessary either due to physical or set restrictions in order to avoid damages to the engine and/or to reduce fuel consumptions when changing speed of the vehicle. In general it is desired to avoid that the engine reaches unnecessary high revolutions per minute (rpm:s) where engine efficiency is relatively low.

Different suggested strategies for controlling an engine are for example disclosed in WO 2011/076226 and US2011/166754, which are directed to cruise control systems, as well as in U.S. Pat. No. 5,343,780; U.S. Pat. No. 5,738,606 and U.S. Pat. No. 6,067,489.

Even though the above described systems provide different solutions for an engine control system there is still a desire for a modified control algorithm in order to improve drivability and fuel efficiency.

In vehicles today, there is often a restriction in allowed torque output from the engine in order to avoid unnecessary wear of the engine and provide a fuel efficient drive. However, there are certain driving conditions under which such a restriction may reduce fuel efficiency, e.g. when the vehicle is driven using a certain gear at rather high engine speeds while it is decided by a transmission control unit that an up-shift not is allowable since the engine will not provide enough torque after the upshift has been made. Hence, a drivetrain could be designed to provide improved performance if the engine is controlled such that when a gear shift is desired but restrictions of the engine prevent a gear shift could the restrictions of the engine be changed such that an extraordinary gear shift is allowed.

Hence, the present invention proposes a control method for a powertrain in a vehicle wherein the powertrain comprises an engine mechanically connected to a gearbox and an Electronic Control Unit (ECU), wherein the method comprises the steps of:

Setting a first general limit for the allowed engine output torque.

Setting a predefined gear shift strategy by the ECU to be followed by the gearbox wherein shift points for gear shifts in the gear box are defined depending on at least engine speed.

Perform a calculation of the expected engine output torque demand as a result of a gear shift according to the predefined gear shift strategy.

Perform a first torque comparison of the expected engine output torque demand with the first general limit for the allowed output torque from the engine. Perform a gear shift according to said predefined gear shift strategy if the first torque comparison indicates that the expected engine output torque is within the first general limit for the allowed engine output torque.

This describes the way many gear shift control strategies function today for an automatic or semiautomatic gearbox. Hence, when performing gear shifts is there generally a control concerning vehicle performance, i.e. the vehicle shall be able to perform a desired acceleration or maintaining the desired speed after a gear shift is made. If it is estimated that these criteria not will be fulfilled after a gear shift, the gear shift is normally not allowed. A gear shift shall thus result in a desired performance of the vehicle. In order to achieve this, and allow gear shifts which under normal circumstances not are allowed even though they may be beneficial for the fuel consumption, may the gear shift strategy be farther improved. Hence, the control method further comprises, in addition to the above described control sequences, the features of;

allowing an extraordinary gear shift, i.e. a gear shift which not is allowed according to the first general limit for the engine output torque. Hence, an extraordinary gear shift may be allowed in spite of the first torque comparison indicating an expected engine output torque demand above the first general limit for the allowed output torque associated with the extraordinary gear shift.

This extraordinary gear shift will only be allowed provided that;

A second torque comparison indicates that the expected engine output torque demand after the extraordinary gear shift is within the limits of a, compared to the first general limit for the allowed engine output torque, second temporarily increased allowed engine output torque limit, and an extraordinary gear shift criteria is fulfilled indicating a gear shift is allowed wherein said criteria is dependent on at least one parameter chosen between estimated fuel efficiency, engine efficiency; expected future torque demand, time of running the engine above the general, engine torque limit and engine temperature.

The control method including the allowance of extraordinary gear shifts which include the feature of allowing the engine to provide an engine output torque above the first general torque limit may comprise the feature that the extraordinary gear shift criteria includes at least the engine will enter a condition that operates outside the normal torque curve which is more fuel efficient than maintaining the present gear while maintaining the desired vehicle speed. Hence, the inclusion of the feature to allow the engine to operate outside the first general torque limit may have the aim to reduce fuel consumption. This feature may be used together with other features, e.g. engine temperature. In order to predict future engine torque demand may a vehicle navigation system, such as a Global Positioning System (GPS) having map data where information of altitudes is included, be used.

The second, temporarily increased allowed engine output torque limit may be set as desired. Depending on the physical construction may the increment of the second, temporarily increased engine output limit differ between different engines. It is in general considered that to an increment of 40% or more not is feasible for the majority of engines and the increment of the engine torque output limit is for the majority of cases below 30% above the first general limit. In general, the increment of the engine output torque limit is within the interval of increasing the allowed engine output between 10-20% above the general output torque limit. In most cases will the increased allowed torque of the engine be up to 10% percent in the practical cases, lire limit, could of course be smaller without any difficulties. However, in order to provide for some margin when performing a shift in order to avoid several down- and upshifts (hunting gears) due to a too restrictive set second, temporarily increased allowed engine output torque limit, it is thought that the temporarily increased engine torque limit should be at least 5%, preferably 10%, above the normal torque limit.

The second, temporarily increased allowed engine output torque limit may be set different for different gears and driving situations. This feature may be particularly useful for higher gears when aiming to reduce fuel consumption and avoiding to run long slopes or hills at a constant high engine speed. Hence, the output engine torque limit increment for the second, temporarily increased engine output torque in percentage compared to the first general limit for the allowed output torque may be larger for at least one gear which is higher than another gear. The increment may be set such that this feature not is enabled at all for lower gears while being used for higher gears.

Hence, the control method may for example be realized such that a gear shift is allowed if it is estimated that the fuel efficiency is increased if a gear shift to a higher gear is made while the first general limit for the allowed engine output torque is increased by 10 percent to the second, temporarily increased allowed engine output torque limit.

The gear shift may be associated with further conditions, e.g. it shall not be indicated that a torque demand outside the temporarily increased allowed engine output torque limit is expected in the near future, e.g. due to an upcoming hill according to GPS and map data for the selected route. Still another restriction, which may be used alone or in combination with the previous described condition, may be that the engine temperature is below a threshold value such that an increased engine output torque not will cause a rise of the temperature in the near future outside an allowable engine temperature.

It is herein referred to GPS and map data to be used for predicting future engine demands. However, other systems known in the art for predicting future traveling resistance and thereby engine torque demand, but not based on the GPS could be used for the invention as well, e.g. the use of a recorded work cycle for a vehicle or other statistical data concerning usage of a vehicle.

The control method may further include the feature that a gear shift made ending up in a torque demand outside the first, general torque limit but within the second, temporarily increased torque limit is only allowed if the engine torque demand is expected to be within the first, general torque limit within a certain limit, e.g. a certain time or certain distance. According to an alternative control strategy criteria may the gearshift be controlled such that no upshift is made if it is indicated that the torque demand soon will be outside the second, temporarily increased engine torque demand.

According to another feature of the invention may the second, temporarily increased torque limit be restricted, e.g. to only last for a certain time or certain distance, and a gear shift is made to a gear which is able to provide a desired torque which is within the first general torque limit after a while. The time restriction could for example be set to 1 minute and/or a distance to 1 kilometer. The restriction could also be dependent on how much the first, general torque limit is exceeded, i.e. if the limit is exceeded by 3%, the time or distance restriction for exceeding the torque limit may be set to a higher value than if the torque limit is exceeded by 10%.

It is possible to implement the feature that the second torque limit is disabled after the torque demand has been below the first, general torque limit for a predefined time. It may also be possible to use a control strategy which disable the second increased torque limit if the torque demand is decreased below the first, general torque limit.

In order to predict future engine torque demand may map data and/or GPS be used in order to predict future travelling conditions. This information may thus be used in order to foresee if an extraordinary gear shift soon should end up in a state wherein the engine output torque demand soon should be outside the second, temporarily increased engine output torque demand and control the gear box to not perform a gear shift.

The invention further relates to a powertrain for a vehicle wherein the powertrain comprises an engine mechanically connected to a gearbox and an Electronic Control Unit (ECU) connected to the gearbox and engine. The ECU is programmed to:
  use a first general limit for the allowed engine output torque
  Use a predefined gear shift strategy to be followed by the gearbox wherein shift points for gear shifts are defined depending on at least engine speed
  Calculate or estimate the expected engine output torque demand as a result of a gear shift according to the predefined gear shift strategy
  Perform a first torque comparison of the expected engine output torque demand with the first general limit for the allowed output torque from the engine
  Send a control signal to the gearbox to perform a gear shift according to said predefined gear shift strategy if the first torque comparison indicates that the expected engine output torque is within the first general limit for the allowed engine output torque.

The ECU is further programmed to allow an extraordinary gear shift in spite of the first torque comparison indicating an expected engine output torque demand above the first general limit for the allowed output torque associated with the extraordinary gear shift provided that
  A second torque comparison indicates that the expected engine output torque demand after the extraordinary gear shift is within the limits of a second, temporarily increased allowed engine output torque limit, and
  an extraordinary gear shift criteria is fulfilled indicating a gear shift is allowed said criteria being dependent on at least one parameter chosen between estimated fuel efficiency, engine efficiency, expected future torque demand, time of running the engine above the general engine torque limit and engine temperature.

The above described Electronic Control Unit (ECU) may either be a single processor or comprise several processors and memories connected to each other so as to form the ECU.

The invention claimed is:
1. A control method for a powertrain in a vehicle, the powertrain comprising an engine mechanically connected to a gearbox and an Electronic Control Unit (ECU), wherein the method comprises the steps of:
  setting a first limit for an allowed engine output torque, setting a predefined gear shift strategy by the ECU to be followed by the gearbox wherein shift points for gear shifts in the gear box are defined depending on at least engine speed, performing a calculation of an expected engine output torque demand as a result of a gear shift according to the predefined gear shift strategy, performing a first torque comparison of the expected engine output torque demand with the first limit for the allowed output torque from the engine, performing a gear shift according to the predefined gear shift strategy if the first torque comparison indicates that the expected engine output torque is below the first limit for the allowed engine output torque, determining that a second torque comparison indicates that the expected engine output torque demand after an extraordinary gear shift is within limits of a second allowed engine output torque limit that is increased compared to the first limit for the allowed output torque, determining that an extraordinary gear shift criteria is fulfilled indicating the extraordinary gear shift is allowed, the extraordinary gear shift criteria being dependent on at least one parameter chosen among estimated fuel efficiency, engine efficiency, expected future torque demand, time of running the engine above the first limit for the allowed engine output torque, and engine temperature, and allowing the extraordinary gear shift in spite of the first torque comparison indicating the expected engine output torque demand above the first limit for the allowed output torque associated with the extraordinary gear shift upon determining that the second torque comparison indicates that the expected engine output torque demand after the extraordinary gear shift is within limits of the second allowed engine output torque and that the extraordinary gear shift criteria is fulfilled.

2. A control method according to claim 1, wherein the extraordinary gear shift criteria includes at least the feature that the gear shift causes the engine to operate in a condition which is more fuel efficient than maintaining the present gear while maintaining the desired vehicle speed.

3. A control method according to claim 1, wherein the second allowed engine output torque limit is up to 30% above the first limit for the allowed engine output torque.

4. A control method according to claim 1, wherein the second allowed engine output torque limit is set such that a limit increment in percentage compared to the first limit for the allowed output torque is larger for at least one gear which is higher than another gear.

5. A control method according to claim 1, wherein a gear shift made ending up in a torque demand outside the first limit for the allowed engine output torque and within the second allowed engine output torque is only allowed if the engine torque demand is expected to be within the first limit for the allowed engine output torque again within a predetermined time or predetermined distance.

6. A control method according to claim 5, wherein the second allowed engine output torque limit is disabled if the torque demand is decreased below the first limit for the allowed engine output torque.

7. A control method according to claim 1, comprising disabling the second allowed engine output torque limit within a predetermined time or predetermined distance, and performing a gear shift to a gear which is able to provide a desired torque which is within the first limit for the allowed engine output torque.

8. A control method according to claim 1, wherein the second allowed engine output torque limit is disabled after the torque demand has been below the first limit for the allowed engine output torque for a predetermined time.

9. A control method according to claim 1, wherein at least one of map data and GPS is used in order to predict future travelling conditions in order to predict future engine torque demand.

10. A powertrain for a vehicle, the powertrain comprising an engine mechanically connected to a gearbox and an Electronic Control Unit (ECU), the ECU being programmed to:

use a first limit for an allowed engine output torque, use a predefined gear shift strategy to be followed by the gearbox wherein shift points for gear shifts are defined depending on at least engine speed, perform a calculation of an expected engine output torque demand as a result of a gear shift according to the predefined gear shift strategy, perform a first torque comparison of the expected engine output torque demand with the first limit for the allowed output torque from the engine, send a control signal to the gearbox to perform the gear shift according to the predefined gear shift strategy when the first torque comparison indicates that the expected engine output torque is within the first limit for the allowed engine output torque, and allow an extraordinary gear shift in spite of the first torque comparison indicating an expected engine output torque demand above the first limit for the allowed output torque associated with the extraordinary gear shift provided that:

a second torque comparison indicates that the expected engine output torque demand after the extraordinary gear shift is within limits of a second allowed engine output torque limit that is increased compared to the first limit for the allowed engine output torque, and an extraordinary gear shift criteria is fulfilled indicating the extraordinary gear shift is allowed, the criteria being dependent on at least one parameter chosen among estimated fuel efficiency, engine efficiency, expected future torque demand, time of running the engine above the first limit for the allowed engine output torque and engine temperature.

* * * * *